(12) United States Patent
Moon

(10) Patent No.: US 6,405,047 B1
(45) Date of Patent: Jun. 11, 2002

(54) DEVICE AND METHOD FOR TRACKING MOBILE STATION'S POSITION IN MOBILE COMMUNICATION SYSTEM

(75) Inventor: Yong-Woon Moon, Kyonggi-do (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/453,516

(22) Filed: Dec. 1, 1999

(51) Int. Cl.[7] .............................. H04Q 7/20; H04Q 7/32
(52) U.S. Cl. ................. 455/456; 455/422; 455/502; 455/67.6; 342/457; 342/450
(58) Field of Search .................... 455/456, 457, 455/422, 426, 502, 503, 424, 425, 67.6, 67.1, 517; 342/457, 450

(56) References Cited

U.S. PATENT DOCUMENTS

| | | | | |
|---|---|---|---|---|
| 4,649,543 A | * | 3/1987 | Levine | 455/502 |
| 5,293,645 A | * | 3/1994 | Sood | 455/456 |
| 5,764,188 A | * | 6/1998 | Ghosh et al. | 455/456 |
| 5,900,838 A | * | 5/1999 | Knan et al. | 455/456 |
| 6,108,556 A | * | 8/2000 | Ito | 455/456 |
| 6,308,073 B1 | * | 10/2001 | Petty et al. | 455/456 |

* cited by examiner

Primary Examiner—William Trost
Assistant Examiner—Keith Ferguson
(74) Attorney, Agent, or Firm—Dilworth & Barrese, LLP (57) ABSTRACT

A device for tracking a mobile station's position in a mobile communication system. The device comprises a receiver for receiving single tone signals and positional information transmitted from at least three base stations; a tone phase measurer for measuring phase differences, dependent on propagation delay, of the tone signals on the basis of a base station's system reference time before propagation delay; and a mobile station's position calculator for calculating positional information of the mobile station using the measured phase differences and the positional information of the base stations.

18 Claims, 9 Drawing Sheets

DEVICE AND METHOD FOR TRACKING MOBILE STATION'S POSITION IN MOBILE COMMUNICATION SYSTEM

PRIORITY

This application claims priority to an application entitled "Device and Method for Tracking Mobile Station's Position in CDMA Mobile Communication System" filed in the Korean Industrial Property Office on Dec. 1, 1998 and assigned Serial No. 98-52235, the contents of which are hereby incorporated by reference.

BACKGROUND OF THE INVENTION

1. Field of the Invention

The present invention relates generally to a mobile communication system, and in particular, to a device and method for tracking a mobile station's position.

2. Description of the Related Art

A proposed radio access standard, IS-95B, for CDMA (Code Division Multiple Access) systems provides a position tracking service for a mobile station. In accordance with a power-up function (PUF), defined by the IS-95 standard, several base stations work in conjunction and detect a mobile station's position through measurement of a propagation delay time for a signal transmitted from the mobile station. The propagation delay time may be measured by analyzing the chip delay of a PN sequence transmitted from the mobile station over a radio link.

In the CDMA mobile communication system, the base station generates a system reference time using the global positioning system (GPS). The mobile station can then synchronize its system reference time with the base station's system reference time. This is accomplished when, upon power-on, the mobile station receives a pilot channel and a sync channel transmitted from the base station and performs an initial sync acquisition for synchronizing its PN (Pseudo Noise) sequence to a PN sequence included in the channels.

In actuality, there is a time difference between the mobile station's system reference time and the base station's system reference time due to an inherent propagation delay. That is, the mobile station's system reference time lags behind the base station's system reference time by a time equal to the propagation delay time. The propagation delay time occurs because the base station's PN sequence is transmitted to the mobile station over the radio link and the mobile station synchronizes its PN sequence to the base station's PN sequence which has already undergone a propagation delay. The propagation delay happens due to the distance between the base station and the mobile station and appears as a function of time with respect to variations in the channel conditions such as the movement of the mobile station.

In the CDMA mobile communication system, the propagation delay time can be measured by analyzing the chip delay of the PN sequence received over the radio link. In general, the mobile station adjusts its system reference time (hereinafter, referred to as a mobile station's system reference time adjust amount) by analyzing the chip delay of the PN sequence transmitted from the base station. This maintains synchronization of the PN sequence between the mobile station and the base station by compensating for the chip delay caused by the propagation delay.

Fundamentally, however, the mobile station's PN sequence lags behind the base station's PN sequence by a predetermined number of chips. This is because the mobile station's PN sequence and the base station's PN sequence become different after initial synchronization due to a propagation delay that occurred during acquisition of the initial synchronization.

The mobile station transmits a message including its PN sequence to the base station. The base station measures a propagation delay time of the message and transmits the propagation delay time information back to the mobile station. Then, the mobile station acquires a time where the propagation delay time information is received, i.e., the base station's system reference time at the present time by using the mobile station system reference time adjust amount from the message transmission time to the propagation delay time information arrival time. The acquired base station's system reference time is an actual base station's system reference time before propagation delay (hereinafter, referred to as an absolute system time).

Figure 1:
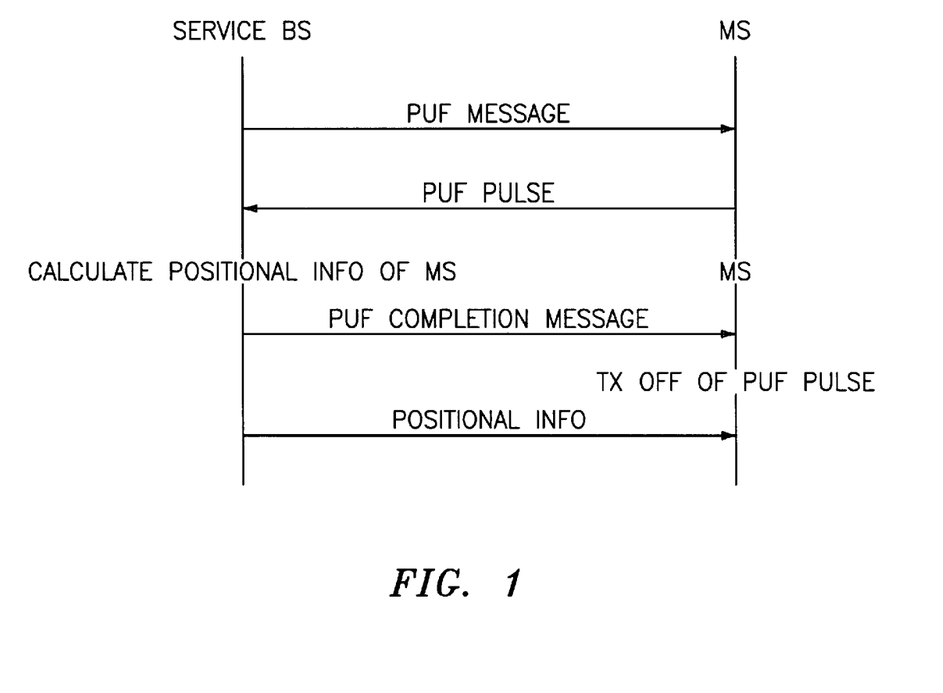
FIG. 1 is a flow diagram illustrating a conventional position tracking procedure.

FIG. 1 shows a conventional position tracking procedure. Referring to FIG. 1, a service base station transmits a PUF message in a traffic channel control state in order to acquire a mobile station's positional information. Upon receipt of the PUF message, the mobile station transmits a PUF pulse to the service base station while increasing the transmission power lever step by step. At the same time, the mobile station transmits the PUF pulse to adjacent base stations (not shown). Since the distance between the mobile station and the adjacent base stations is typically greater than the distance between the mobile station and the service base station, the mobile station transmits the PUF pulse to the adjacent base stations at the transmission power level which is much higher than the normal transmission power level for communication with the service base station. The service base station and the adjacent base stations measure the propagation delay time of the received PUF pulse and calculate the mobile station's positional information. After calculating the mobile station's positional information, the service base station transmits a PUF completion message to the mobile station. The PUF completion message includes the latitude, longitude and measure time information. The mobile station then stops transmission of the PUF pulse.

In the conventional position tracking method, it is possible to track the mobile station's position only by request of the base station in an active station (i.e., the traffic channel control state). That is, position tracking for the mobile station can be performed only during a call, therefore, it is not possible to provide a continuous position tracking service.

In addition, when a PUF message is sent from the service base station, the mobile station transmits the PUF pulse to the non-service adjacent base stations at a transmission power level which is much higher than the normal transmission power level for communication with the service base station. This causes an increase in interference with the reverse link. This will not only reduce the traffic capacity of the reverse link but it will also increase the power consumption of the mobile station.

As described above, the conventional method for tracking a mobile station's position is disadvantageous in that the PUF pulse transmitted from the mobile station to the adjacent base stations causes an increase in interference with the reverse link. Measuring the phase differences, dependent on propagation delay, of tone signals transmitted from the adjacent base stations enables the mobile station to calculate its positional information. This does not require the transmission of the PUF pulse. In this manner, the mobile station should know beforehand an absolute system time that corresponds to each base station. This absolute system time is a reference time that is used for the measurement of the propagation delay of the respective tone signals.

SUMMARY OF THE INVENTION

It is, therefore, an object of the present invention to provide a device and method for calculating positional information of a mobile station on demand.

It is another object of the present invention to provide a device and method for calculating positional information of a mobile station, using the phase delay of tone signals transmitted from adjacent base stations and positional information of the adjacent base stations.

It is a further another object of the present invention to provide a device and method for calculating positional information of a mobile station using phase differences associated with tone signals transmitted at different time points from the respective adjacent base stations on the basis of an absolute system time.

To achieve the above and other objects of the present invention, there is provided a device for tracking a mobile station's position in a CDMA (Code Division Multiple Access) mobile communication system. The device comprises a receiver for receiving single tone signals and positional information transmitted from at least three base stations; a tone phase detector for measuring phase differences, dependent on propagation delay, of tone signals transmitted from a plurality of base stations on the basis of the absolute system time; and a mobile station's position calculator for calculating positional information of the mobile station using the measured phase differences of the tone signals and positional information of the base stations.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described herein below with reference to the accompanying drawings. In the following description, well-known functions or constructions are not described in detail since they would obscure the invention in unnecessary detail.

In the embodiment of the present invention, the mobile station measures a phase delay of the tone signals transmitted from respective adjacent base stations to calculate the distances to each base station. The distance information is used to calculate positional information thereof. The tone signal means a no-modulation frequency tone signal different from the channel standard of the CDMA system. The adjacent base stations transmit their tone signals at specific periods with different time lags. Further, the adjacent base stations transmits their tone signals at different time points to the mobile station in order to prevent inter-modulation between the tone signals. In addition, the tone signals can have either the same frequency or different frequencies.

Figure 2:
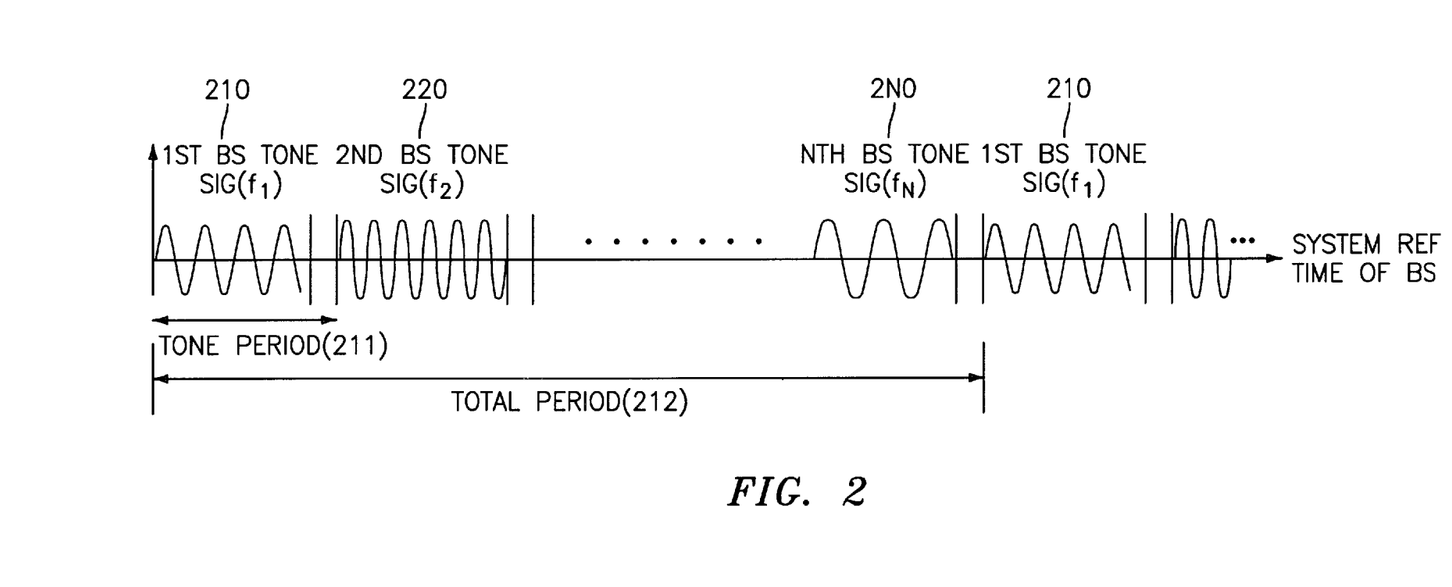
FIG. 2 is a diagram illustrating adjacent base stations which periodically transmit their tone signals to a mobile station at different time points according to an embodiment of the present invention.

FIG. 2 shows a situation where the adjacent base stations periodically transmit their tone signals to the mobile station at different time points according to an embodiment of the present invention. Referring to FIG. 2, there is shown an X-axis which indicates the passage of an absolute system time, and first to Nth base station tone signals 210–2N0 having frequencies $f_1$–$f_N$, respectively. Further, the respective tone signals have a tone period 211, and the total tone period 212 is the sum of the tone periods of the first to Nth base station tone signals 210–2N0.

Figure 3:
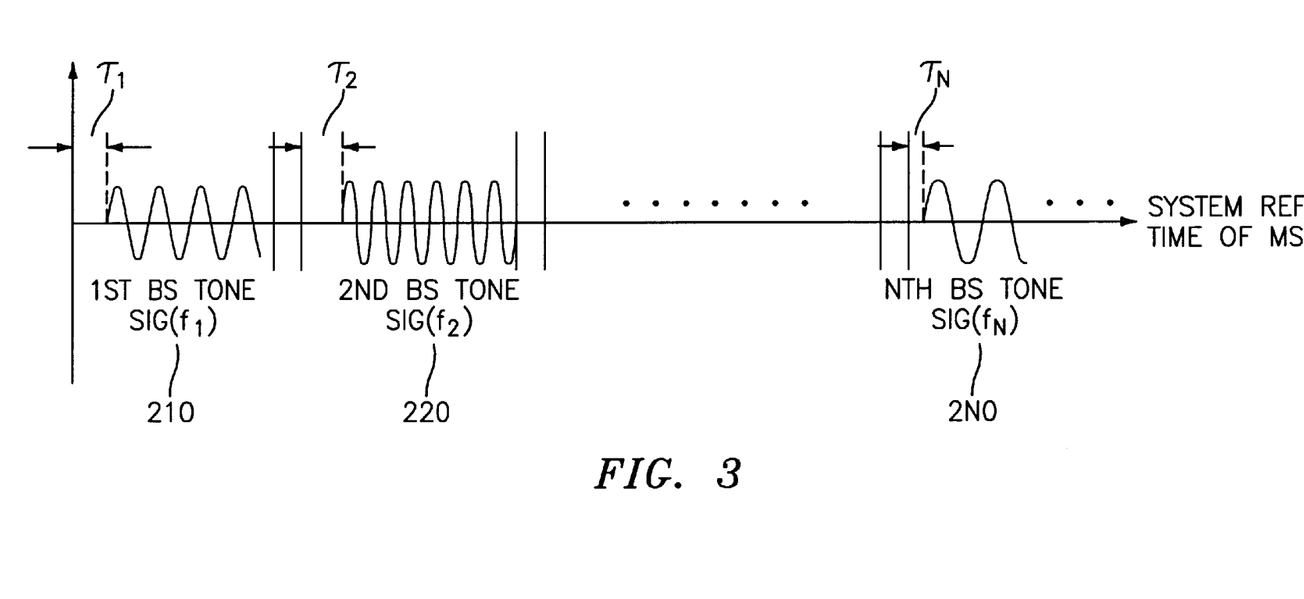
FIG. 3 is a diagram illustrating a phase difference between an arrival time of tone signals transmitted from the adjacent base stations and an absolute system time according to an embodiment of the present invention.

FIG. 3 shows a phase difference between an arrival time of tone signals transmitted from the adjacent base stations and an absolute system time according to an embodiment of the present invention. In FIG. 3, an X-axis indicates the passage of the mobile station's system reference time, and reference numerals 210–2N0 indicate the tone signals transmitted from first to Nth base stations. Here, the respective tone signals experience propagation delay according to the distance between the mobile station and the corresponding base station. That is, the first to Nth base station tone signals 210–2N0 have first to Nth phase differences $\Gamma_1$ to $\Gamma_N$ with respect to the absolute system time due to the propagation delay.

Figure 4:
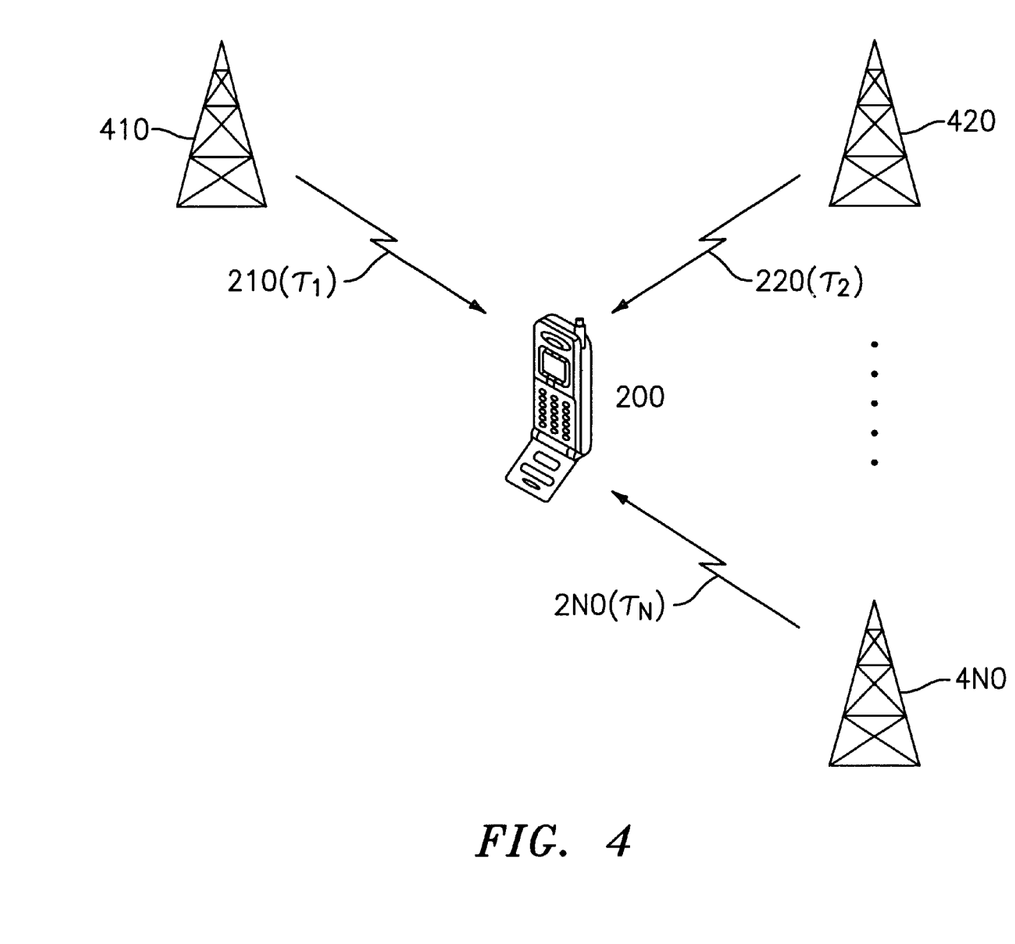
FIG. 4 is a diagram illustrating how a mobile station calculates positional information thereof using phase difference information transmitted from the respective adjacent base stations and positional information of the adjacent base stations according to an embodiment of the present invention.

FIG. 4 shows how the mobile station calculates positional information using phase difference information transmitted from the respective adjacent base stations and positional information of the adjacent base stations according to an embodiment of the present invention.

Referring to FIG. 4, there is shown a mobile station 200 that receives first to Nth base station tone signals 210–2N0 at different time points. The mobile station 200 can measure the phase difference of each tone signal if it knows an absolute system time at a receiving time of the tone signals. The phase difference is proportional to the distance between the mobile station 200 and the corresponding base station. When the mobile station 200 knows the phase difference information of the respective tone signals from the adjacent base stations and the positional information of the adjacent base stations, the mobile station 200 can calculate its positional information.

That is, the mobile station 200 can measure the distances from the adjacent base stations depending on the phase difference information of the respective tone signals. Further, the mobile station 200 receives positional information of the base stations from the service base station and can calculate a position thereof by triangulation.

As described above, in order to measure phase differences of the tone signals from the adjacent base stations, the mobile station 200 should acquire and maintain an absolute system time, based on which the phase differences will be measured.

Figure 5:
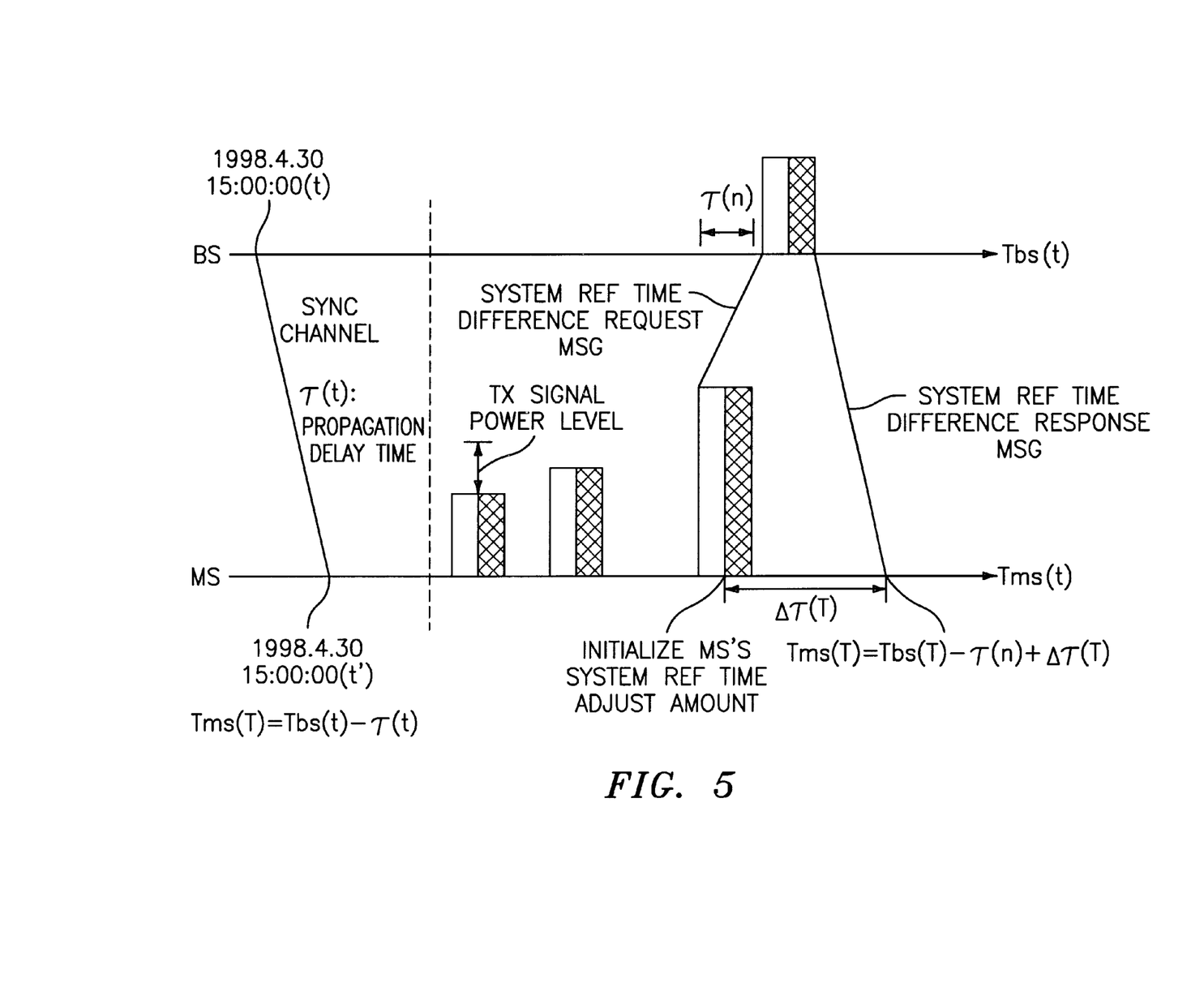
FIG. 5 is a diagram illustrating how the mobile station acquires a base station's absolute system time according to an embodiment of the present invention.

FIG. 5 shows how the mobile station acquires a base station's absolute system time according to an embodiment of the present invention.

Referring to FIG. 5, an upper X-axis indicates the passage of the base station's absolute system time and a lower X-axis indicates the passage of the mobile station's system reference time. First, the mobile station acquires the mobile station's system reference time through an initial sync acquisition. However, as illustrated, the acquired mobile station's system reference time t' lags behind the base station's absolute system time t by the propagation delay time Γ(t). The propagation delay time occurs due to the distance between the mobile station and the base station and appears as a function of time depending on the variations in the channel conditions such as movement of the mobile station.

Equation (1) below shows the relationship between mobile station's system reference time and the base station's absolute system time.

$$T_{ms}(t) = T_{bs}(t) - \Gamma(t) \tag{1}$$

Equation (1) implies that the mobile station's system reference time $T_{ms}(t)$ lags behind the base station's absolute system time $T_{bs}(t)$ by the propagation delay time Γ(t).

To acquire the absolute system time, the mobile station transmits a system reference time difference request message to the base station. Here, the "system reference time difference" refers to a difference between the mobile station's system reference time and the base station's absolute system time.

The mobile station may transmit the system reference time difference request message using an access procedure provided in the IS-95 system. The system reference time difference request message is comprised of actual data and a preamble. In the preamble PN sequence information of the mobile station is included.

Upon receipt of the system reference time difference request message, the base station detects the mobile station's PN sequence included in the preamble. The base station measures the propagation delay time by examining a delay condition according to the propagation delay of the received PN sequence.

As illustrated, the mobile station transmits the system reference time difference request message to the base station over the access channel while increasing the transmission power step by step. The system reference time difference request message is indicated as a probe and is comprised of a preamble and data. When the system reference time difference request message is connected at a time point 'n', the base station measures the propagation delay time Γ(t) as a confirmation of the system reference time difference request message at the time point 'n'. The base station then transmits to the mobile station a system reference time difference response message according to the propagation delay time Γ(t) of the system reference time difference request message. The mobile station receives the system reference time difference response message at a time T, and then calculates the base station's system absolute time at the time T.

The difference between the mobile station's system reference time and the base station's absolute system time at the time T can be expressed as $$T_{ms}(T) = T_{bs}(T) - \Gamma(T) \tag{2}$$

where T denotes the time point where the mobile station has received the system reference time difference response message, and Γ(T) denotes the propagation delay time of the system reference time difference response message.

Further, Γ(T) can be expressed as $$\Gamma(T) = \Gamma(n) - \Delta\Gamma(T) \tag{3}$$

where ΔΓ(T) denotes the time duration from a time point where the mobile station transmitted the system reference time difference request message to the base station, to a time point where the mobile station received the system reference time difference response message.

That is, as shown in Equation (3), the propagation delay time Γ(T) of the system reference time difference response message can be represented by the difference between the propagation delay time Γ(n) of the system reference time request message and the mobile station's system reference time adjust amount ΔΓ(T).

When Equation (3) is written in Equation (2), $$T_{ms}(T) - \Delta\Gamma(T) = T_{bs}(T) - \Gamma(n) \tag{4}$$

Equation (4) can be rewritten as follows:

$$T_{bs}(T) = T_{ms}(T) - \Delta\Gamma(T) + \Gamma(n) \tag{5}$$

That is, the base station's absolute system time $T_{bs}(T)$ at the time T can be calculated by Equation (5).

Figure 6:
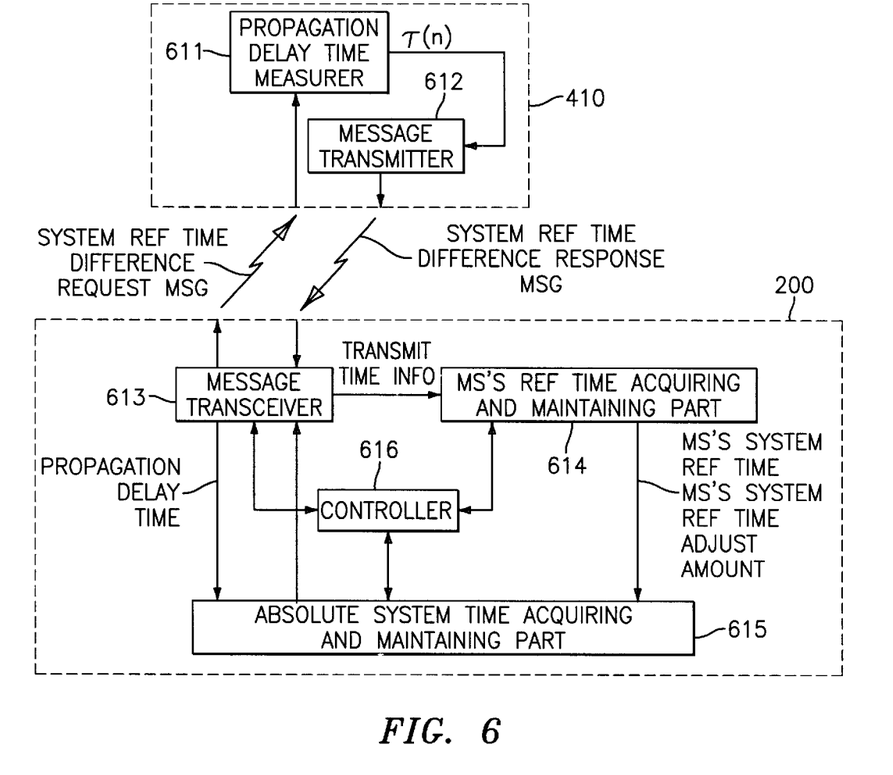
FIG. 6 is a block diagram illustrating an internal structure of a mobile station and adjacent base stations, for acquiring an absolute system time according to an embodiment of the present invention.

FIG. 6 shows an internal structure of a mobile station and adjacent base stations, for acquiring the absolute system time at the request of the mobile station according to an embodiment of the present invention.

Referring to FIG. 6, there is shown a mobile station 200 in communication with a base station 410. A message transceiver 613 in the mobile station 200 transmits a message to the base station 410 and receives a message transmitted from the base station 410. In particular, the message transceiver 613 transmits the system reference time difference request message to the base station 410 under the control of a controller 616. At this point, message transceiver 613 outputs information about a time point where the system reference time difference request message is transmitted to the base station 410 (hereinafter referred to as transmit time information), to a mobile station's system reference time acquiring and maintaining part 614. Further, upon receipt of the system reference time difference response message from the base station 410, the message transceiver 613 outputs information about the propagation delay of the system reference time difference request message included in the received message to an absolute system time acquiring and maintaining part 615. Here, the mobile station 200 may transmit the system reference time difference request message using an access procedure provided in the IS-95 system.

When the base station 410 receives the system reference time difference request message at a time point 'n', a propagation delay time measurer 611 in the base station 410 detects a PN sequence included in a preamble of the received message. The base station 410 then measures the propagation delay time Γ(n) of the system reference time difference request message transmitted from the mobile station 200. The propagation delay time measurer 611 outputs the propagation delay time Γ(n) of the system reference time difference request message to a message transmitter 612. The message transmitter 612 transmits, to the mobile station 200 a system reference time difference response message corresponding to the propagation delay time Γ(n) of the received system reference time difference request message.

Meanwhile, the mobile station's system reference time acquiring and maintaining part 614 acquires and maintains the mobile station's system reference time by initial sync acquisition, and generates a mobile station's system reference time adjust amount to maintain synchronization of the PN sequence with the base station 410. In particular, the mobile station's system reference time acquiring and maintaining part 614 initializes the mobile station's system reference time adjust amount whenever the transmit time information is received, and maintains the mobile station's system reference time adjust amount from the time point where the transmit time information is received to the time point T where the system reference time difference response message is received. Further, upon receipt of the system reference time difference response message from the base station 410, the mobile station's system reference time acquiring and maintaining part 614 outputs the mobile station's system reference time adjust amount ΔΓ(T) from the time point where the system reference time difference request message is transmitted to the time point T where the system reference time difference response message is received, and the mobile station's system reference time $T_{ms}(T)$ to the absolute system time acquiring and maintaining part 615.

The absolute system time acquiring and maintaining part 615 receives the propagation delay time Γ(n) of the system reference time difference request message output from the message transceiver 613 and the ΔΓ(T) and $T_{ms}(T)$ output from the mobile station's system reference time acquiring and maintaining part 614, and calculates the base station's absolute system time $T_{bs}(T)$ at the time T. At this point, the absolute system time acquiring and maintaining part 615 acquires and maintains the absolute system time $T_{bs}(T)$ using Equation (5).

A controller 616 controls each element included in the mobile station 200. In particular, the controller 616 controls the message transceiver 613, the mobile station's system reference time acquiring and maintaining part 614 and the absolute system time acquiring and maintaining part 615, so that the mobile station 200 can acquire the absolute system time. Further, upon receipt of the system reference time difference response message, the controller 616 informs this situation to the mobile station's system reference time acquiring and maintaining part 614.

Figure 7:
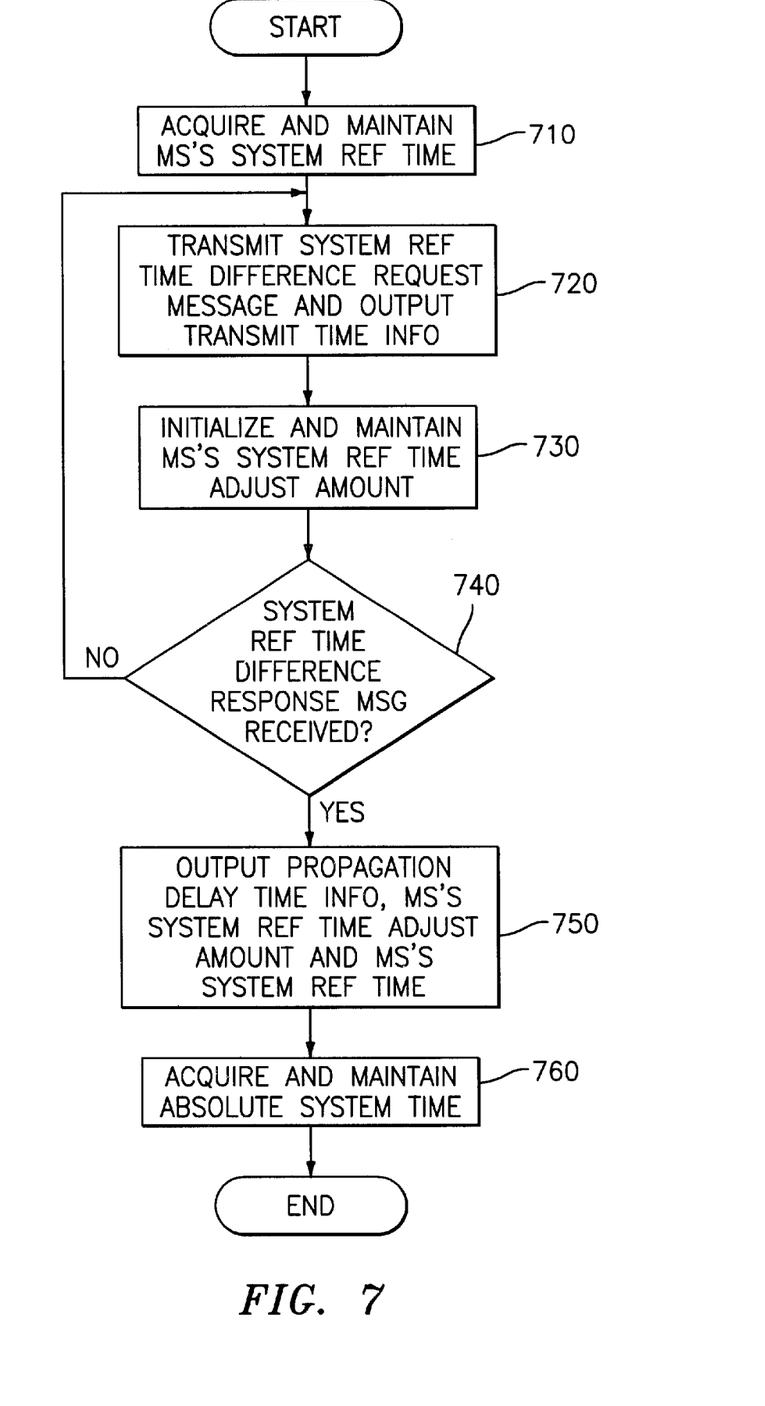
FIG. 7 is a flow chart illustrating a procedure for acquiring and maintaining an absolute system time in the mobile station according to an embodiment of the present invention.

FIG. 7 shows a procedure for acquiring and maintaining the absolute system time in the mobile station according to an embodiment of the present invention.

Referring to FIG. 7, in step 710, the mobile station 200 acquires and maintains the mobile station's system reference time through initial sync acquisition. In step 720, the message transceiver 613 transmits a system reference time difference request message to the base station 410 under the control of the controller 616. The system reference time difference request message includes a preamble with a PN sequence. Further, the message transceiver 613 outputs transmit time information to the mobile station's system reference time acquiring and maintaining part 614 under the control of the controller 616. In step 730, the mobile station's system reference time acquiring and maintaining part 614 initializes the mobile station's system reference time adjust amount whenever the transmit time information is received, under the control of the controller 616. In step 740, the controller 616 determines whether the system reference time difference response message is received from the base station 410. When the system reference time difference response message is not received, the controller 616 returns to the step 720. However, upon receipt of the system reference time difference response message, the mobile station's system reference time acquiring and maintaining part 614, under the control of the controller 616, outputs the mobile station's system reference time adjust amount and the mobile station's system reference time to the absolute system time acquiring and maintaining part 615, in step 750. Further, the message transceiver 613, under the control of the controller 616, outputs the propagation delay time of the system reference time difference request message based on the received system reference time difference response message, to the absolute system time acquiring and maintaining part 615. In step 760, the absolute system time acquiring and maintaining part 615 acquires and maintains the absolute system time using the mobile station's system reference time adjust amount, the mobile station's system reference time and the propagation delay time, under the control of the controller 616.

In the description given with reference to FIGS. 5 to 7, it is noted that the mobile station 200 acquires the base station's absolute system time $T_{bs}(T)$ at the present time T by using the propagation delay time Γ(n) of the system reference time difference request message, the mobile station's system reference time adjust amount ΔΓ(T) from the transmit time of the system reference time difference request message to the time T, and the mobile station's system reference time $T_{ms}(T)$ at the present time T when the mobile station 200 has received the system reference time difference response message.

Figure 8:
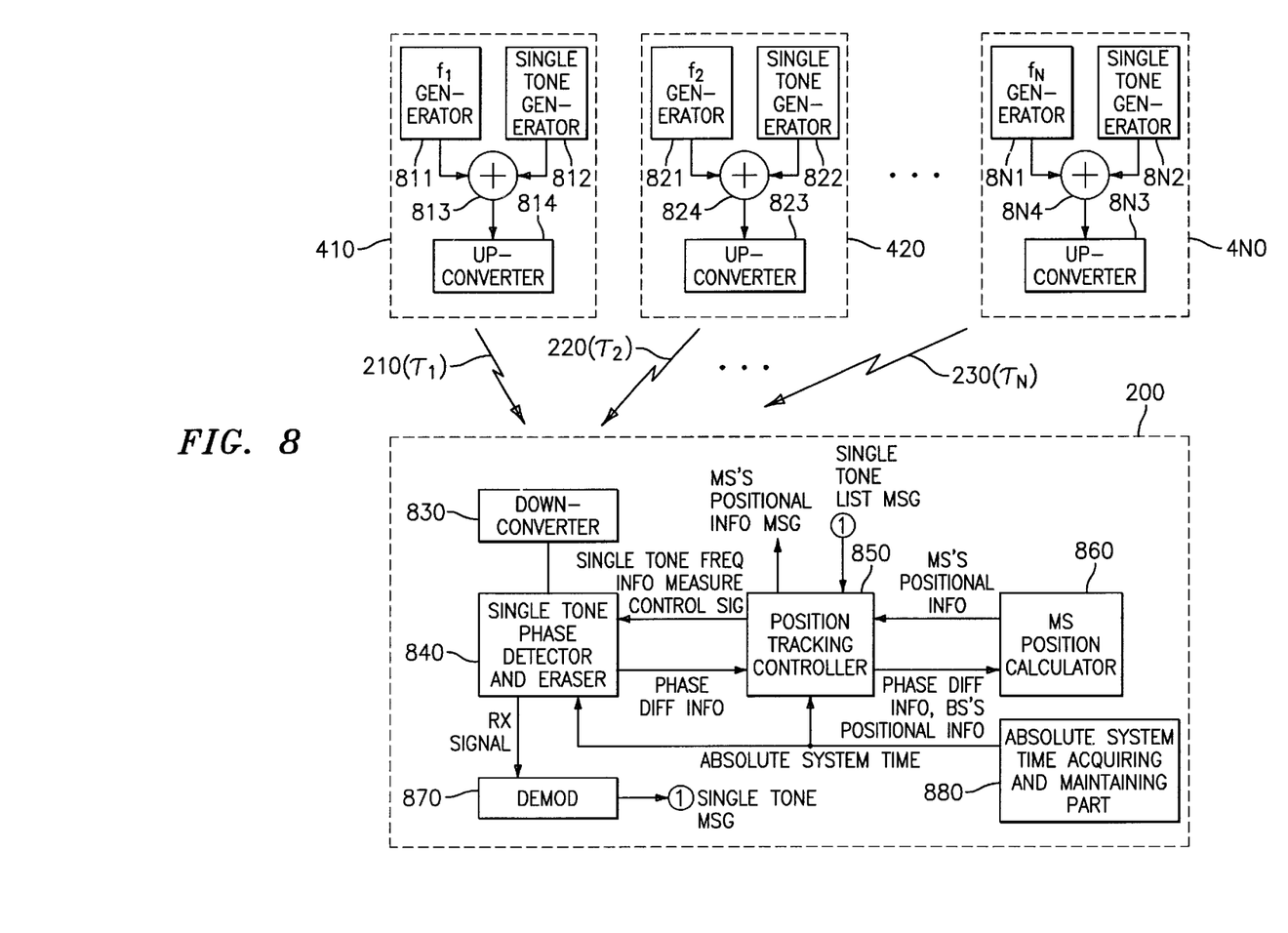
FIG. 8 is a block diagram illustrating an internal structure of a mobile station and adjacent base stations, for calculating positional information of the mobile station according to an embodiment of the present invention.

FIG. 8 shows an internal structure of a mobile station and adjacent base stations, for calculating positional information of the mobile station according to an embodiment of the present invention.

Referring to FIG. 8, the first to Nth base stations 410–4N0 periodically transmit first to Nth base station tone signals 210–2N0 to the mobile station 200 at different time points, respectively. Transmission power of the first to Nth base station tone signals 210–2N0 can be adjusted such that only the mobile stations located in the service area of the adjacent base stations can detect the tone signals.

A tone signal transmission method of the first base station 410 includes a single tone generator 812 for generating a single tone, a carrier generator 811 for modulating the single tone, a mixer 813 for mixing the single tone with the carrier, and an upconverter 814 for up-converting an output of the mixer 813 to a radio transmission signal. The tone signal transmission methods of the second to Nth base stations 420–4N0 have the same structure as that of the first base station 410.

Meanwhile, a down-converter 830 in the mobile station 200 receives the first to Nth base station signals 210–2N0 and down-converts the received signals to baseband signals. A single tone phase detector and eraser 840 measures phase differences of the first to Nth base station tone signals 210–2N0 according to a control signal received. The single tone phase detector and eraser 840 outputs first to Nth phase difference information $Γ_1$–$Γ_N$. The above-stated control signal is comprised of a single tone period signal and a measure command signal (hereinafter, the single tone period signal and the measure command signal will be referred to as a measure control signal). The measure control signal can be generated by request of the controller shown in FIG. 6. Upon receipt of the measure control signal, the single tone phase detector and eraser 840 measures the phase differences of the first to Nth base station tone signals 210–2N0 corresponding to the single tone period signal. The single tone period signal has the tone period 211 of FIG. 2.

Measurement of the phase difference for the respective tone signals is performed based on the absolute system time. That is, the single tone phase detector and eraser 840 measures the phase differences due to the propagation delay on the basis of the absolute system time (hereinafter, referred to as a position measure time) at the time when the respective tone signals are received. The absolute system time is provided from the absolute system time acquiring and maintaining part 880. Further, the single tone phase detector and eraser 840 receives frequency information (hereinafter, referred to as single tone frequency information) of the respective tone signals, and erases the first to Nth base station tone signals 210–2N0 before outputting received signals. The single tone phase detector and eraser 840 uses a single tone which has a 180° phase difference to the respective single tones.

The single tone can be applied as an interference component to the data transmission bond by generating imaginary frequency which is a multiple of the single tone frequency. This may cause a serious problem.

A demodulator 870 demodulates the received signal. When the demodulated signal is comprised of a single tone period, base station identifier (ID), base station's positional information and single tone frequency information (hereinafter, a message comprised of the above information will be referred to as a single tone list message), the demodulator 870 outputs the single tone list message to a position tracking controller 850. The single tone list message is transmitted from the service base station to which the mobile station 200 is presently connected. Further, the single tone list message can be transmitted over a common control channel.

The single tone list message is not a message for a specific mobile station, but includes information to be provided to every mobile station for position tracking. Therefore, the single tone list message should be transmitted over a control channel used in common by every mobile station. For example, a paging channel corresponds to that channel in the IS-95A system.

The position tracking controller 850 stores the received single tone list message. Further, the position tracking controller 850 outputs the single tone frequency information and an operation control signal to the single tone phase detector and eraser 840. The position tracking controller 850 outputs the phase difference information received from the single tone phase detector and eraser 840 and the positional information of the respective base stations, to a mobile station's position calculator 860. Moreover, the position tracking controller 850 stores the absolute system time at the time point where the respective tone signals are received, i.e., at the position measure time. In addition, upon receipt of a mobile station's position information request message from the base station, the position tracking controller 850 transmits the mobile station's positional information and the position measured time on a message to the base station (hereinafter, a message comprised of the mobile station's positional information and the position measured time will be referred to as a mobile station's position information message).

The mobile station's position calculator 860 receives the phase difference information, i.e., the distances between the mobile station 200 and the respective base stations and the positional information of the respective base stations, and calculates positional information of the mobile station 200. The mobile station's position calculator 860 outputs the mobile station's positional information to the position tracking controller 850. The mobile station's positional information can be calculated by triangulation.

An absolute system time acquiring and maintaining part 880 having the structure shown in FIG. 6, acquires and maintains the absolute system time. The absolute system time acquiring and maintaining part 880 outputs the maintained absolute system time to the single tone phase detector and eraser 840 and the position tracking controller 850, whenever the mobile station's position is calculated.

Figure 9:
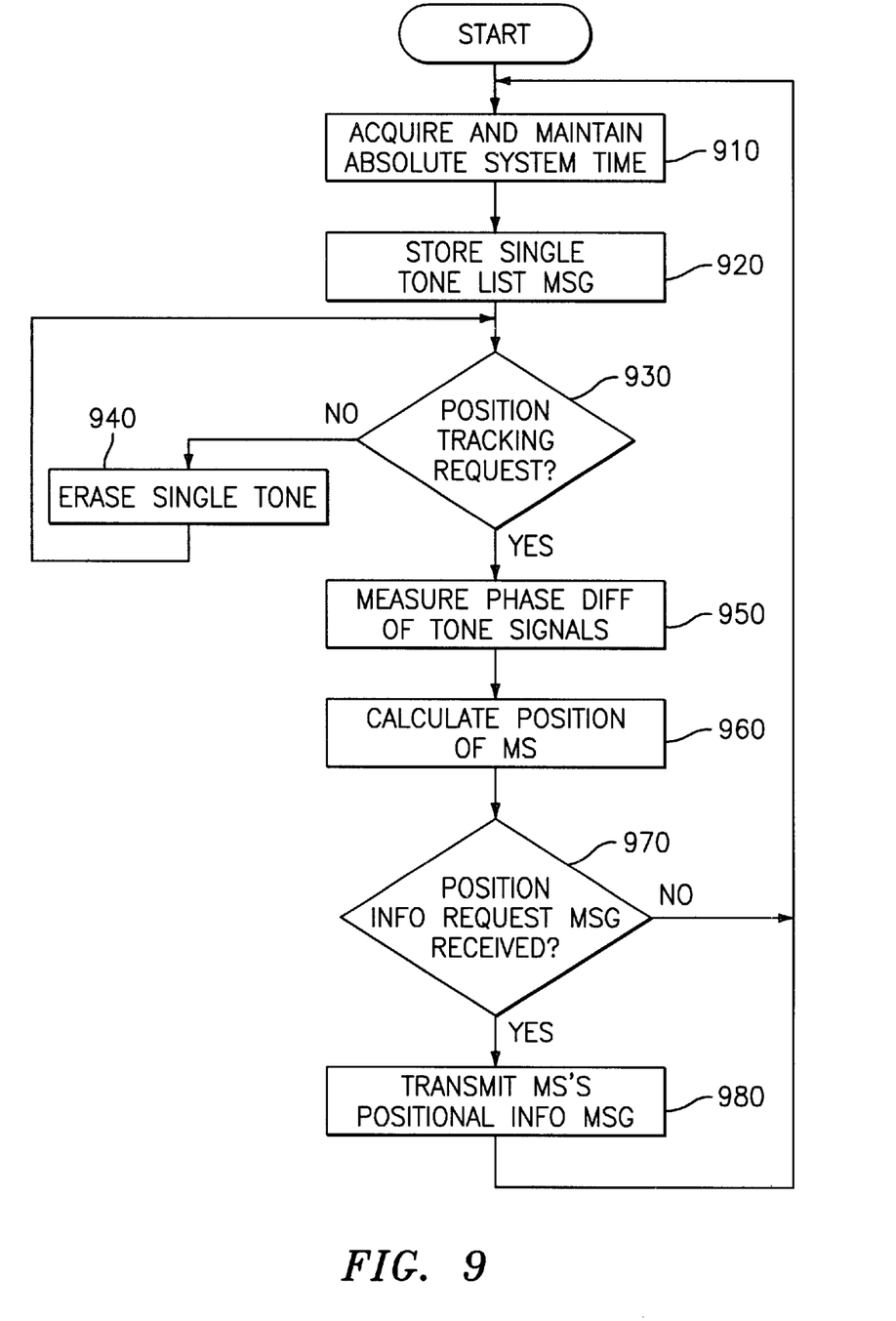
FIG. 9 is a flow chart illustrating a procedure for tracking a mobile station's position according to an embodiment of the present invention.

FIG. 9 shows a procedure for tracking a mobile station's position according to an embodiment of the present invention.

Referring to FIG. 9, in step 910, the absolute system time acquiring and maintaining part 880 acquires and maintains the absolute system time. In step 920, the position tracking controller 850 stores the single tone list message received. In step 930, the position tracking controller 850 determines whether there is a position tracking request from the controller 616. When there is no position tracking request, the position tracking controller 850 does not output the measure command signal, in step 940. Therefore, the single tone phase detector and eraser 840 erases only the single tone of the respective base station tone signals, without measuring the phase difference for the first to Nth base station tone signals 201–2N0. However, when there is a position tracking request by the controller 616 in step 930, the single tone phase detector and eraser 840, under the control of the position tracking controller 850, measures the phase differences of the first to Nth base station tone signals 210–2N0 due to the propagation delay, to output the phase difference information, in step 950. Here, measurement of the phase differences for the tone signals is performed based on the absolute system time. In step 960, the mobile station's position calculator 860 receives the phase difference information and the positional information of the base stations included in the single tone list message, and calculates the mobile station's positional information, under the control of the position tracking controller 850. The mobile station's positional information is stored in the position tracking controller 850. Therefore, calculations of the mobile station's position can be performed at the request of the mobile station. Further, it is possible to measure the distance between the mobile station and the respective base stations by using the phase difference of the tone signals transmitted from the adjacent base stations. Accordingly, power control and traffic capacity of the reverse link may not be affected. In addition, since it is not necessary for the mobile station to transmit a signal to the adjacent base stations over the reverse link at a transmission power level higher than the normal transmission power level, it is possible to reduce power consumption.

In step 970, the position tracking controller 850 examines whether a position information request message is received from the service base station. When the position information request message is not received, the position tracking controller 850 returns to step 910. However, upon receipt of the position information request message, the position tracking controller 850 transmits a mobile station's position information message to the service base station in step 980.

In the description given with reference to FIGS. 2 to 9, it is noted that the mobile station measures the phase differences of the tone signals transmitted at different time from the adjacent base stations on the basis of the absolute system time, and calculates its positional information using the phase difference information and the positional information of the respective base stations.

As described above, the novel mobile station's position tracking device and method can perform position tracking at the request of the mobile station, so that it is possible to provide a continuous position tracking service. In addition, the device and method can measure the distance between the mobile station and the respective base stations by using the phase difference of the tone signals transmitted from the adjacent base stations. Therefore, it is possible to reduce power consumption of the mobile station since a power control problem of the reverse link is solved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A device for tracking a mobile station's position in a mobile communication system, comprising:

a receiver for receiving tone signals form at least three base stations, and positional information of the base stations from the service base station;

a tone phase measurer for measuring phase differences, dependent on propagation delay, of the tone signals on the basis of a base station's system reference time before propagation delay; and a mobile station's position calculator for calculating positional information of the mobile station using the measured phase differences and the positional information of the base stations.

2. The device as claimed in claim 1, further comprising an absolute system time acquiring and maintaining part for acquiring and maintaining the base station's system reference time before propagation delay by using propagation delay time information for a message transmitted from the service base station to the mobile station, a mobile station's system reference time adjust amount from a transmission time of the message to a receiving time of the message, and a mobile station's system reference time.

3. The device as claimed in claim 2, wherein the absolute system time acquiring and maintaining part comprises:

a message transceiver for transmitting the message including a PN (Pseudo Noise) sequence to the service base station, and a message receiver for receiving propagation delay time information for the message from the service base station;

a mobile station's system reference time acquiring and maintaining part for initializing and maintaining the mobile station's system reference time adjust amount when the message including the PN sequence is transmitted; and an absolute system time acquiring part for acquiring an absolute system time using the propagation delay time information, the mobile station's system reference time adjust amount and the mobile station's system reference time.

4. The device as claimed in claim 3, wherein the absolute system time acquiring and maintaining part acquires and maintains the base station's system reference time before propagation delay in accordance with a formula (1) defined as $$T_{ms}(T) - \Delta \Gamma(T) = T_{bs}(T) - \Gamma(n) \quad (1)$$

where T denotes a time point where the mobile station has received the propagation delay time information, n denotes a time point where the service base station receives the message including the PN sequence from the mobile station, $T_{ms}(T)$ denotes the mobile station's system reference time at the time T, $\Delta\Gamma(T)$ denotes the mobile station's system reference time adjust amount from a time point where the mobile station transmits the message to the service base station to the time T, $T_{bs}(T)$ denotes the absolute system time at the time T, and $\Gamma(n)$ denotes the propagation delay time information of the message including the PN sequence of the mobile station, received at the service base station.

5. The device as claimed in claim 4, wherein the formula (1) is determined from formulas (2) and (3) below:

$$\Gamma(T) = \Gamma(n) - \Delta\Gamma(T) \quad (2)$$

$$T_{ms}(T) = T_{bs}(T) - \Gamma(T) \quad (3)$$

where $\Gamma(T)$ denotes a propagation delay time occurred when the propagation delay time information is received at the mobile station.

6. The device as claimed in claim 1, further comprising a position tracking device for providing the mobile station's position calculator with positional information and identification information of the base stations, received from the service base station, providing the tone phase measurer with period and frequency information of the respective tone signals, and transmitting the calculated mobile station's positional information to the service base station.

7. The device as claimed in claim 6, wherein the positional information and identification information of the base stations, and period and frequency information of the tone signals are transmitted over a common control channel.

8. The device as claimed in claim 1, wherein each of the base stations comprises:

a tone generator for generating the tone signal;

a carrier frequency generator for modulating the tone signal;

a mixer for mixing the tone signal with the carrier frequency; and an up-converter for converting an output of the mixer to a frequency band suitable for radio transmission.

9. The device as claimed in claim 1, wherein the base stations each periodically transmit their tone signals at different time points.

10. A method for tracking a mobile station's position in a mobile communication system, comprising the steps of:

receiving tone signals from at least three base stations, and positional information of the base stations from a service base station;

measuring phase differences, dependent on propagation delay, of the tone signals on the basis of a base station's system reference time before propagation delay; and calculating positional information of the mobile station using the measured phase differences and the positional information of the base stations.

11. The method as claimed in claim 10, further comprising the step of acquiring and maintaining the base station's system reference time before propagation delay by using propagation delay time information for a message transmitted from the service base station to the mobile station, a mobile station's system reference time adjust amount from a transmission time of the message to a receiving time of the message, and a mobile station's system reference time.

12. The method as claimed in claim 10, wherein the step of acquiring and maintaining the base station's system reference time before propagation delay comprises the steps of:

transmitting the message including a PN sequence to the service base station, and receiving propagation delay time information for the message from the service base station;

initializing and maintaining the mobile station's system reference time adjust amount when the message including the PN sequence is transmitted; and    acquiring an absolute system time using the propagation delay time information, the mobile station's system reference time adjust amount and the mobile station's system reference time.

13. The method as claimed in claim 12, wherein the base station's system reference time before propagation delay is calculated in accordance with a formula (4) defined as $$T_{ms}(T) - \Delta\Gamma(T) = T_{bs}(T) - \Gamma(n) \quad (4)$$

where T denotes a time point where the mobile station has received the propagation delay time information, n denotes a time point where the service base station receives the message including the PN sequence from the mobile station, $T_{ms}(T)$ denotes the mobile station's system reference time at the time T, $\Delta\Gamma(T)$ denotes the mobile station's system reference time adjust amount from a time point where the mobile station transmits the message to the service base station to the time T, $T_{bs}(T)$ denotes the absolute system time at the time T, and $\Gamma(n)$ denotes the propagation delay time information of the message including the PN sequence of the mobile station, received at the service base station.

14. The method as claimed in claim 13, wherein the formula (4) is determined from formulas (5) and (6) below:

$$\Gamma(T) = \Gamma(n) - \Delta\Gamma(T) \quad (5)$$

$$T_{ms}(T) = T_{bs}(T) - \Gamma(T) \quad (6)$$

where $\Gamma(T)$ denotes a propagation delay time occurred when the propagation delay time information is received at the mobile station.

15. The method as claimed in claim 10, further comprising the step of providing a mobile station's position calculator with positional information and identification information of the base stations, received from the service base station, providing a tone phase measurer with period and frequency information of the respective tone signals, and transmitting the calculated mobile station's positional information to the service base station.

16. The method as claimed in claim 15, wherein the positional information and identification information of the base stations, and period and frequency information of the tone signals are transmitted over a common control channel.

17. The method as claimed in claim 10, wherein each of the base stations comprises:

a tone generator for generating the tone signal;

a carrier frequency generator for modulating the tone signal;

a mixer for mixing the tone signal with the carrier frequency; and    an up-converter for converting an output of the mixer to a frequency band suitable for radio transmission.

18. The method as claimed in claim 17, wherein the base stations each periodically transmit their tone signals at different time points.

\* \* \* \* \*